US008087853B2

(12) United States Patent
Stukuls (10) Patent No.: US 8,087,853 B2
(45) Date of Patent: Jan. 3, 2012

(54) ADJUSTABLE POCKET HOLE APPARATUS (76) Inventor: Alfred Stukuls, Brookline, MA (US)

( * ) Notice: Subject to any disclaimer, the term of this patent is extended or adjusted under 35 U.S.C. 154(b) by 274 days.

(21) Appl. No.: 12/640,031

(22) Filed: Dec. 17, 2009

(65) Prior Publication Data
US 2011/0150587 A1   Jun. 23, 2011

(51) Int. Cl.
B23B 39/22  (2006.01)

(52) U.S. Cl. ........... 408/53; 408/37; 408/39; 408/40; 408/115 R; 408/88; 408/135; 408/136

(58) Field of Classification Search ............ 408/37, 408/39–41, 46, 87–88, 110, 115 R, 135, 136; B23B 39/16, 39/28, 39/22
See application file for complete search history.

(56) References Cited

U.S. PATENT DOCUMENTS

| 620,614 | A | * | 3/1899 | Rockwell et al. | 408/39 |
| 1,414,589 | A | * | 5/1922 | Seavey | 408/1 R |
| 1,755,401 | A | * | 4/1930 | Koehl et al. | 408/51 |
| 2,390,420 | A | * | 12/1945 | Burke | 408/41 |
| 2,615,480 | A | * | 10/1952 | Konrad | 144/24.06 |
| 2,731,050 | A | * | 1/1956 | Nunn | 408/46 |
| 2,890,730 | A | * | 6/1959 | Gottlieb | 408/39 |
| 3,452,792 | A | * | 7/1969 | Foreman | 408/50 |
| 3,548,686 | A | * | 12/1970 | Marks | 408/13 |
| 4,486,128 | A | * | 12/1984 | Baker et al. | 408/3 |
| 5,119,855 | A | * | 6/1992 | Knighten et al. | 144/35.1 |
| 6,599,064 | B1 | | 7/2003 | Robinson | |
| 6,955,508 | B1 | * | 10/2005 | Radcliffe | 408/37 |
| 7,044,690 | B1 | * | 5/2006 | Charvat | 408/1 R |
| 7,374,373 | B1 | | 5/2008 | Park | |
| 2002/0150434 | A1 | | 10/2002 | Sommerfeld et al. | |

FOREIGN PATENT DOCUMENTS

| FR | 2773091 A1 | * | 7/1999 |
| JP | 01156002 A | * | 6/1989 |
| JP | 07-314224 A | | 12/1995 |
| JP | 2005-111580 A | | 4/2005 |

* cited by examiner

Primary Examiner — Daniel Howell
(74) Attorney, Agent, or Firm — Altman & Martin; Steven K. Martin (57) ABSTRACT In the pocket hole apparatus of the present invention, a table reciprocates linearly relative to a base. An anvil is fixed relative to the base and holds the workpiece on a sloped top surface at the desired angle for the pocket hole. A drill spindle with a drill bit is fixed relative to the table. After the workpiece is mounted to the anvil, the table is moved to drill the pocket hole. Optionally, a second spindle on the opposite side of the anvil predrills the pocket hole when the table is first moved to a predrill position. The spindle is enabled or disabled by latching mechanism. The spindle is mounted to a rail that is slidably mounted to the table so that the rail can slide perpendicularly thereby adjusting the spacing between pocket holes.

20 Claims, 13 Drawing Sheets

ADJUSTABLE POCKET HOLE APPARATUS

CROSS-REFERENCES TO RELATED APPLICATIONS

Not Applicable

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to woodworking tools, more particularly, to an apparatus for drilling pocket holes.

2. Description of the Related Art

Pocket hole joinery involves drilling a hole at a shallow angle into one workpiece and then joining it to a second workpiece with a self-tapping screw. Pocket hole machines have at least one drill spindle mounted to a table or jig. The workpiece is mounted to the table at an angle to the spindle that matches the angle at which the hole is to be drilled. The spindle with a drill bit attached is pushed linearly to drill the hole.

Current pocket hole machines suffer from a lack of flexibility. Most pocket hole machines can drill only one hole at a time. There are machines that can drill more than one hole simultaneously, but only at a fixed spacing. If spacing other than the fixed spacing or multiples thereof is desired, all but one spindle is removed or disabled and the holes are drilled one at a time.

BRIEF SUMMARY OF THE INVENTION

An object of the present invention is to provide a pocket hole machine that can drill multiple holes with essentially infinitely variable spacing.

In the basic apparatus of the PHM of the present invention a table reciprocates linearly relative to a base. The table can be reciprocated manually or automatically. Stops control how far the table can move relative to the base.

An anvil is fixed relative to the base and holds the workpiece on a sloped top surface. The angle of the top surface corresponds to the desired angle of the pocket hole. Optionally, the drill angle can be changed either by removing and replacing the entire anvil or by designing the anvil so the top portion is replaceable. A bracket secures the workpiece against the sloped surface. The anvil includes a through hole aligned that acts as a drill guide during drilling.

A drill spindle with a drill bit is fixed relative to the table. The workpiece is mounted to the anvil while the table is in a neutral position. The table is moved from the neutral position to the drill position to drill the pocket hole. The table is moved back to the neutral position and the workpiece is removed. Optionally, a second spindle on the opposite side of the anvil from the first spindle predrills the pocket hole if the table is first moved to a predrill position opposite the drill position.

The spindle is capable of being enabled or disabled, depending on whether or not it is to drill a pocket hole. A latching mechanism latches the spindle to the table to enable it or it latches the spindle to the base to disable it.

The spindle is mounted to a rail that is slidably mounted to the table so that the rail can slide perpendicularly to the drilling direction. The rail controls the perpendicular motion of the anvil associated with the spindle so that the spindle and anvil remain aligned. This sliding motion permits adjustment of the spacing between pocket holes.

A drill bit may be broken at the point of contact with the board due to the shallow angle of entry into the board. The present invention optionally includes a mechanism to combat this problem. A slow cylinder is tied to the main cylinder of the reciprocating mechanism. While PHM is in the neutral position, the main cylinder is retracted and the slow cylinder piston, which abuts the end of a bracket on the top surface of the base, is fully retracted. During the slow phase of the drilling cycle, the slow cylinder is pressurized so that the piston extends for a preset distance with a force sufficient to overcome the retracted main cylinder. Then the main cylinder takes over to complete the drilling cycle.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

DETAILED DESCRIPTION OF THE INVENTION

The present invention is a pocket hole machine ("PHM") for drilling multiple pocket holes and where the spacing between holes is infinitely adjustable. The next paragraphs summarized the apparatus and the details follow.

The basic apparatus of the PHM of the present invention is shown in the figures. A table 14 reciprocates linearly relative to a base 12 in a drilling direction 22. An anvil 16 with a sloped top surface 102 is fixed relative to the base 12 in the drilling direction 22 and a drill spindle 18 with a step drill bit 30 is fixed relative to the table 14 in the drilling direction 22. The workpiece 2 is mounted to the anvil 16 while the table 14 is in a neutral position 24 shown in FIG. 22. The spindle 18 is started and the table 14 is moved in the drilling direction 22 from the neutral position 24 to the drill position 26 to drill the pocket hole 4. The table 14 is moved back to the neutral position 24 and the workpiece 2 is removed.

In order to allow for infinite spacing adjustment, the spindle 18 is mounted to a rail 40. The rail 40 is slidably mounted to the table 14 so that the rail 40 can slide perpendicularly to the drilling direction 22 in a spacing direction 42. This sliding motion permits adjustment of the spacing between pocket holes 4.

Figure 1:
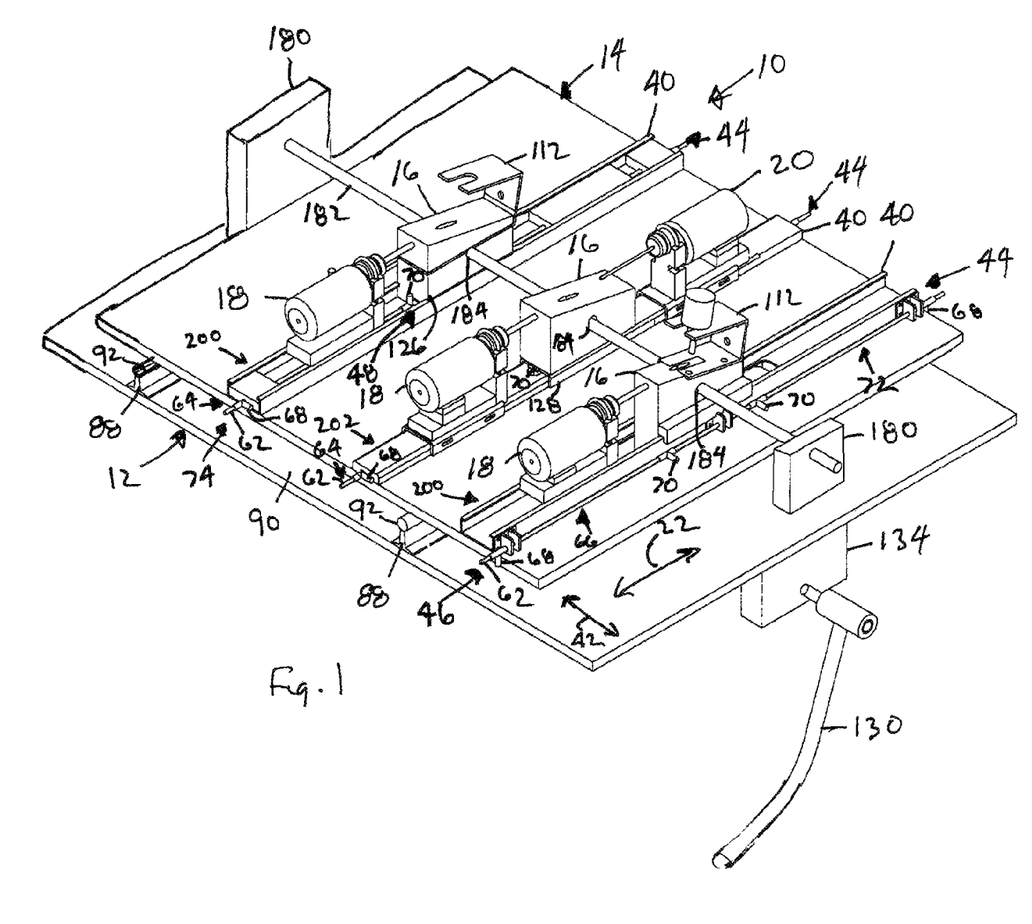
FIG. 1 is a top, perspective view of the single-rod embodiment of the pocket hole machine of the present invention showing various configuration options.

The motion of the rail 40 in the drilling direction 22 can also be fixed relative to either the base 12 or the table 14. As seen in FIG. 1, the rail 40 includes a latch 44 that latches the rail 40 to the table 14, as at 46, or to the base 12 via the anvil 16, as at 48. Using this latch 44, the rail 40 can be either enabled (latched to the table 14) or disabled (latched to the anvil 16). When enabled, the spindle 18 moves with the table 14 to drill a pocket hole 4. When disabled, the spindle 18 does not move with the table 14 and the spindle does not drill a pocket hole 4.

Optionally, a second spindle 20 is mounted to the rail 40 on the opposite side of the anvil 16 from the first spindle 18. In this arrangement, the first spindle drill bit 30 is not a step bit. The table 14 moves in the drilling direction 22 to a predrill position 28, where the second spindle bit 32 predrills the hole for the screw shank. After the table 14 is moved back to the neutral position 24, it then continues in the same direction to the drill position 26 where the first spindle bit 30 drills the countersink hole for the screw head.

Figure 2:
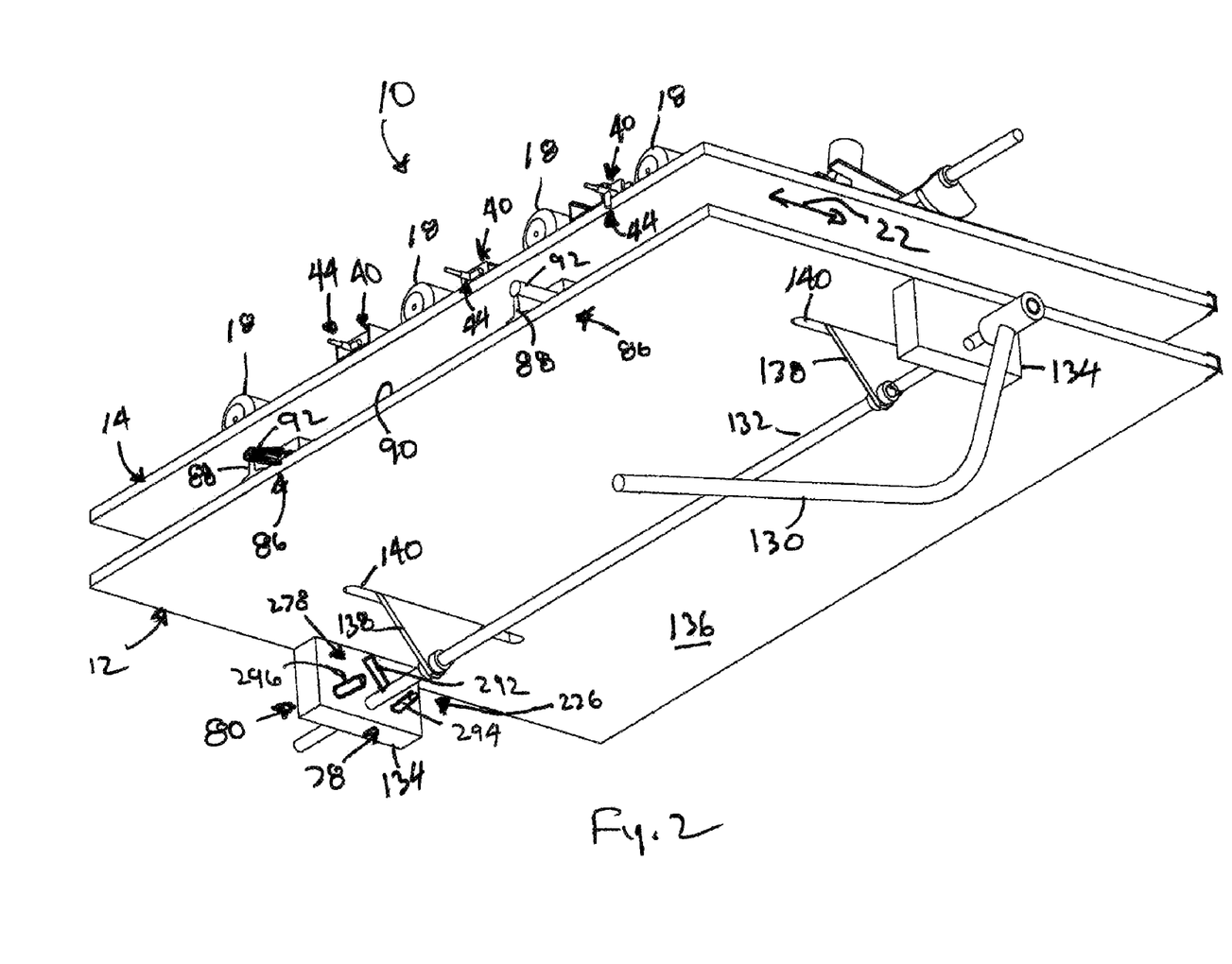
FIG. 2 is a bottom, perspective view of the pocket hole machine of FIG. 1 showing elements of the sliding and manual-operation mechanisms.
Figure 3:
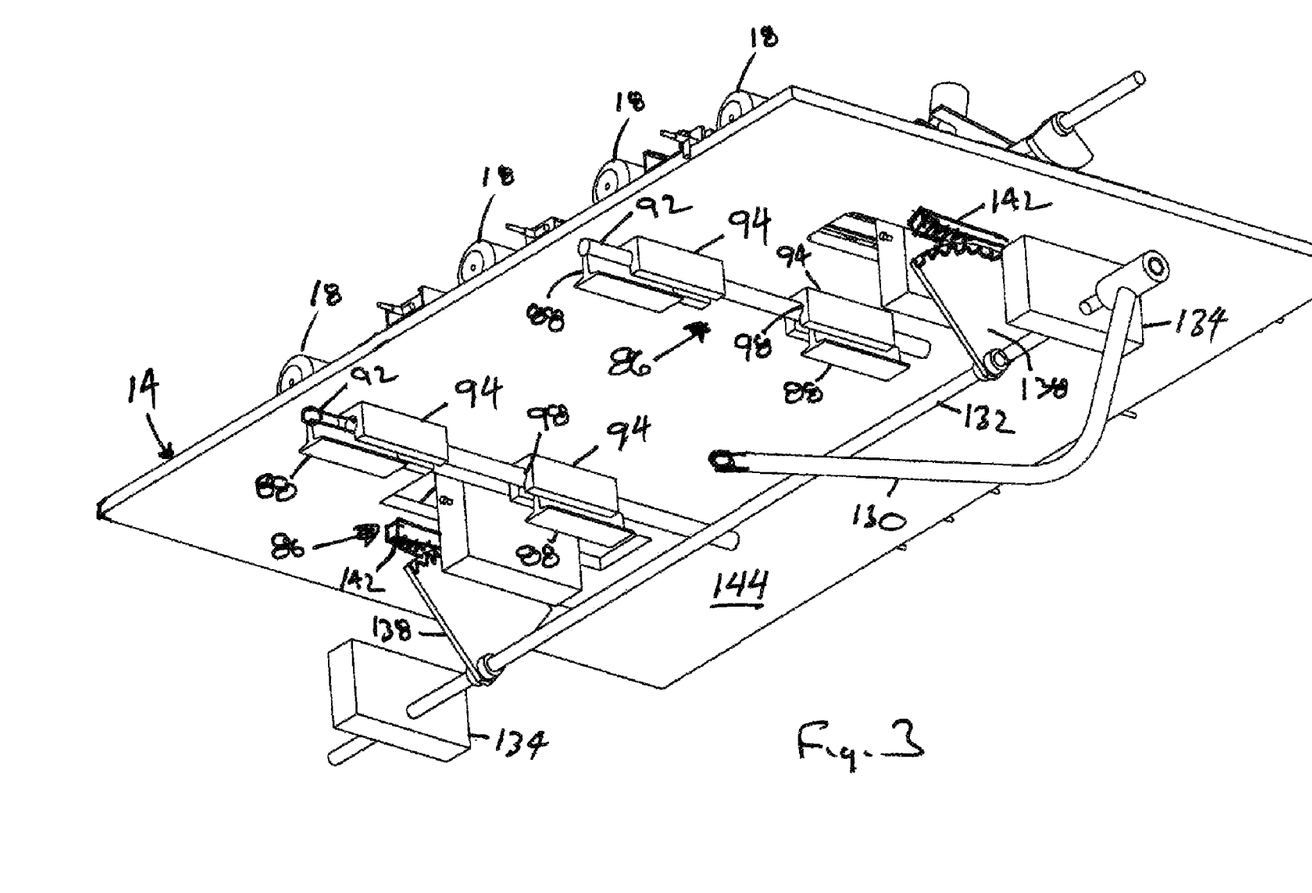
FIG. 3 is a bottom, perspective view of the table of FIG. 1 without the base showing elements of the sliding and manual-operation mechanisms.

As described above, the table 14 is mounted to the base 12 so that is can slide linearly in the drilling direction 22. There are many ways known in the art to mount the table 14 to slide, any of which is contemplated for use by the present invention. One such mechanism 86 is shown in FIGS. 2 and 3. Pylons 88 mounted to the top surface 90 of the base 12 support horizontal cylindrical rods 92. Blocks 94 mounted to the bottom surface 96 of the table 14 have a C-shaped openings 98 adapted to slidably receive the rods 92.

The present invention contemplates that the table 14 can be moved either manually or automatically. One contemplated manually-operated mechanism is shown in FIGS. 2 and 3. A handle 130 is attached to the end of a shaft 132 that is rotatably mounted to a pair of supports 134 attached to the bottom surface 136 of the base 12. Each of a pair of gears 138 fixed to the shaft 132 extend through slots 140 in the base 12 and mate with a rack 142 mounted to the bottom surface 144 of the table 14. As the handle 130 is rotated, the gears 138 rotate. As the gears 138 rotate, the rack 142 moves linearly, moving the table 14. The reason for mounting the supports under the base 12 is the small clearance between the base 12 and table 14 and the existence of the sliding mechanism 86. However, the present invention does contemplate that the supports and axle can be mounted to the top surface of the base 12.

Figure 5:
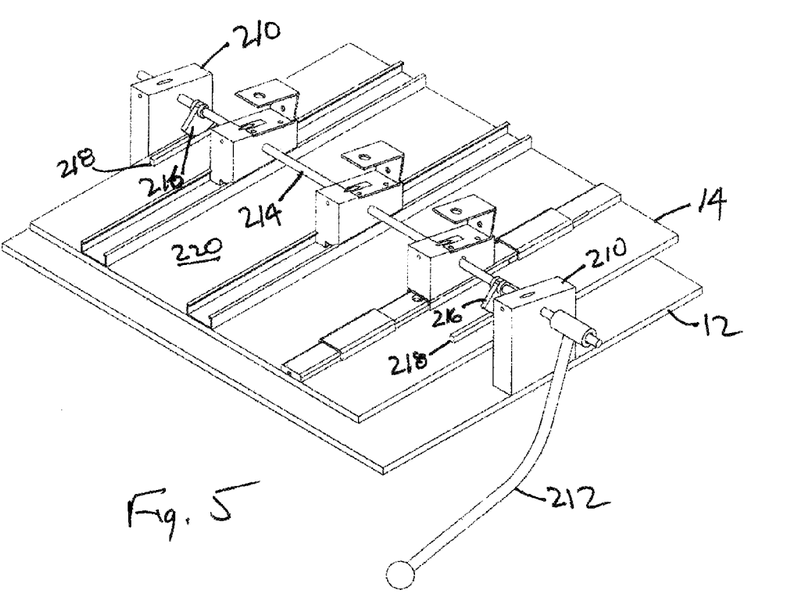
FIG. 5 is a perspective view showing an alternate manual-operation mechanism.

Another manually-operated mechanism is shown in FIG. 5. Supports 210 attached to the top surface 90 of the base 12 extend above the table 14. The ends of the rod 214 that maintains the position of the anvils 16, as described below, are rotatably mounted to the supports 210. A handle 212 is attached to one end of the rod 214 and a pair of gears 216 are fixed to the rod 214. The gears 216 mate with corresponding racks 218 mounted to the top surface 220 of the table 14. Moving the handle 212 rotates the rod 214 and gears 216. As the gears 216 rotate, the rack 218 moves linearly, moving the table 14.

Figure 6:
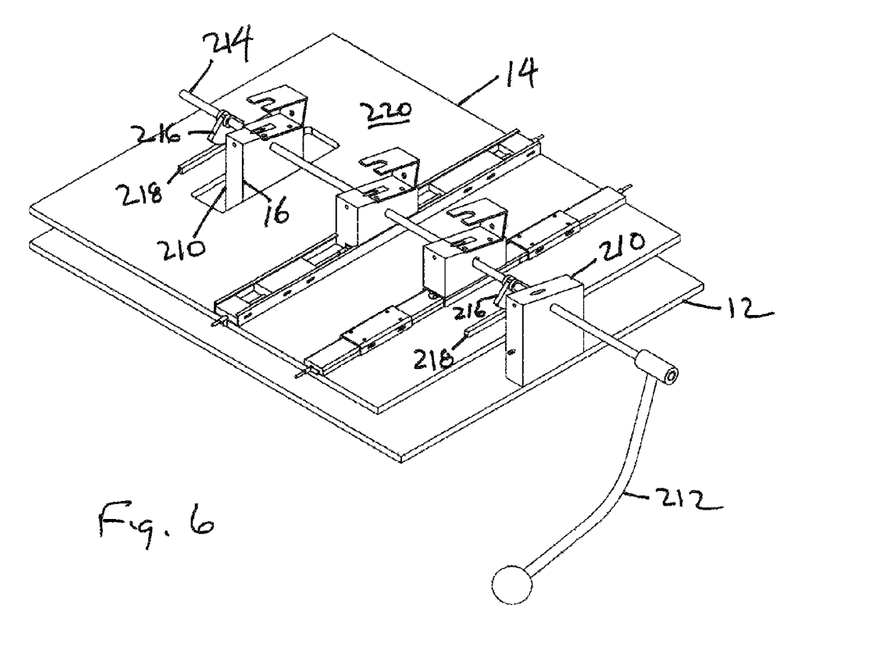
FIG. 6 is a perspective view showing an alternative to the manual-operation mechanism of FIG. 5.

Optionally, one of the supports 210 can be an anvil 16, as shown in FIG. 6, or both of the supports 210 can be anvils 16. If the position of one or both end anvils 16 does not have to be adjusted, it or they can be fixed and used as supports 210.

Figure 4:
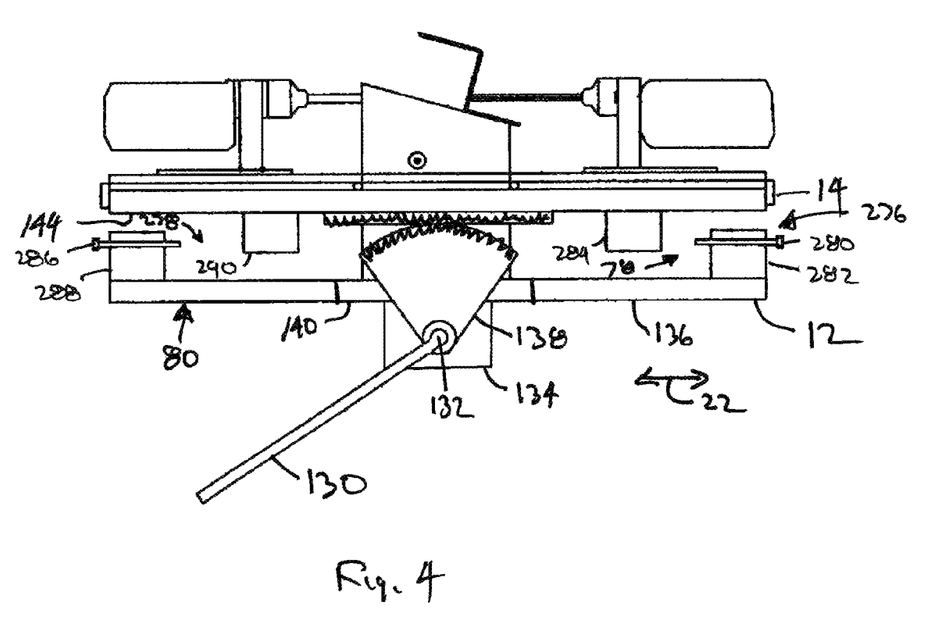
FIG. 4 is a cross-sectional view of the manual-operation mechanism of FIGS. 2 and 3.

When moving the table 14 manually, it is desirable to set stops to limit how far the table 14 can move, thereby setting the maximum depth of the countersink portion of the pocket hole. There are many methods known in the art for setting stops, any of which can be used in the present invention. The stop can be fixed if the machine will only have to drill a single hole depth or the stops can be adjustable so that different hole depths can be drilled. A drill stop 276 and a predrill stop 278 can be placed on the base 12, as in FIG. 4, to limit motion of the table 14. A block 282, 288 extends from the base 12 toward the table 14. To be adjustable, a screw 280, 286 is turned into a threaded hole in the block 282, 288. The screw 280, 286 is turned in or out to set the stop limit. When a block 284, 290 extending from the table bottom surface 144 hits the screw 280, 286, the table motion is stopped.

Drill stop 276 and predrill stop 278 can be placed on one of the supports 134, as in FIG. 2, to limit the rotation of the axle 132, thus limiting the table motion. One or a pair of fingers 294, 296 extend from the support 134 and an arm 292 is fixed to the axle 132. Alternatively, the gear 138 can act as the arm. As the axle 132 rotates, the arm 292 contacts the fingers 294, 296 to prevent further rotation. To be adjustable, a screw is turned into a threaded hole in the finger 294, 296. The screw is turned in or out to set the stop limit.

Figure 7:
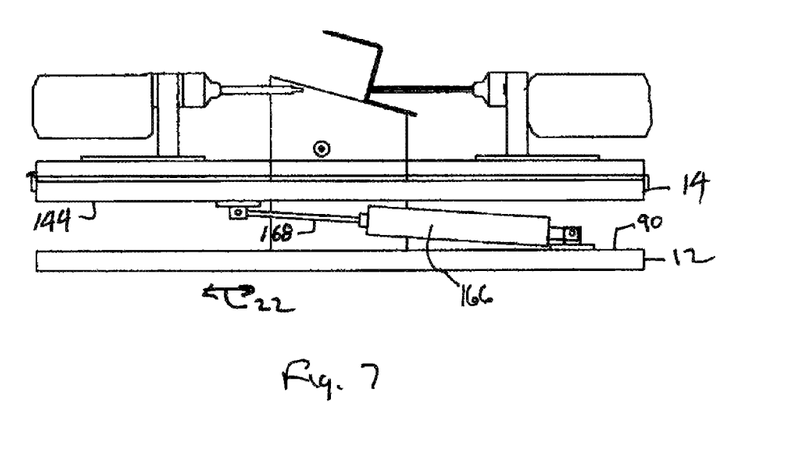
FIG. 7 is a cross-sectional view showing a single-piston pneumatic cylinder operating mechanism.
Figure 8:
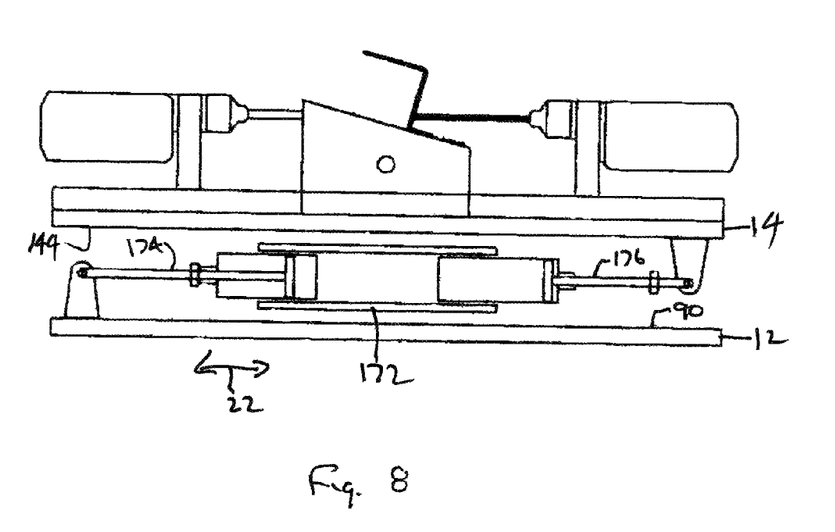
FIG. 8 is a cross-sectional view showing a double-piston pneumatic cylinder operating mechanism.

There are many different possible automatic motion mechanisms available in the art and are contemplated for use by the present invention. Pneumatic, electronic, or step motors and in combination can be used to automate the machine. In one possible method, the axle 132 described above is operated by the motor. In another, motion is via a standard pneumatic cylinder 166, with the cylinder housing 170 fixed to the top surface 90 of the base 12 and the piston 168 fixed to the bottom surface 144 of the table 14, as shown in FIG. 7. In another, motion is via a double-piston pneumatic cylinder 172, with one piston 174 fixed to the top surface 90 of the base 12 and the other piston 176 fixed to the bottom surface 144 of the table 14, as shown in FIG. 8.

A drill bit may be broken at the point of contact with the board due to the shallow angle of entry into the board, particularly if the drill contacts a harder surface or a knot. All present day PHMs advance the drill bit at a uniform speed throughout its cutting cycle contributing to the drill breaking problem. The present invention optionally includes a mechanism 250 for advancing the drill bit at an adjustable speed for a selected distance before the PHM continues with its normal advancing speed.

Figure 9:
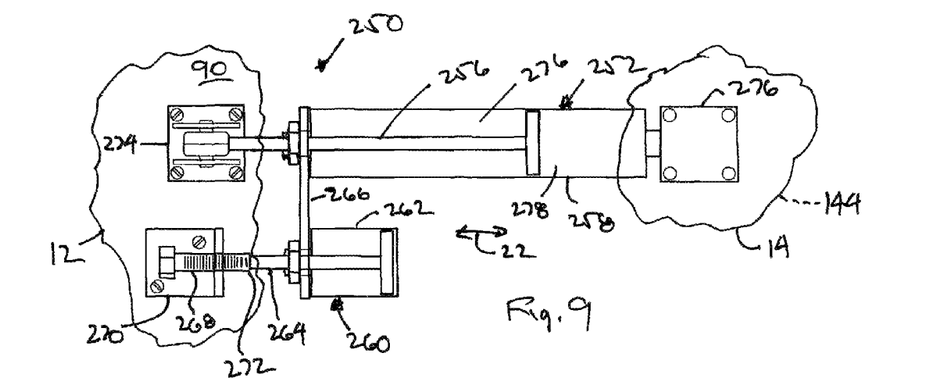
FIG. 9 is a top view of a speed control mechanism employing two cylinders in the neutral position.
Figure 10:
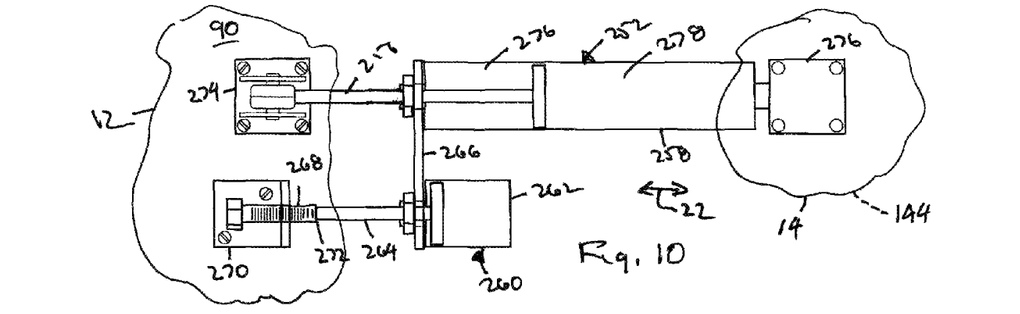
FIG. 10 is a top view of the speed control mechanism of FIG. 9 at the end of the slow phase.
Figure 11:
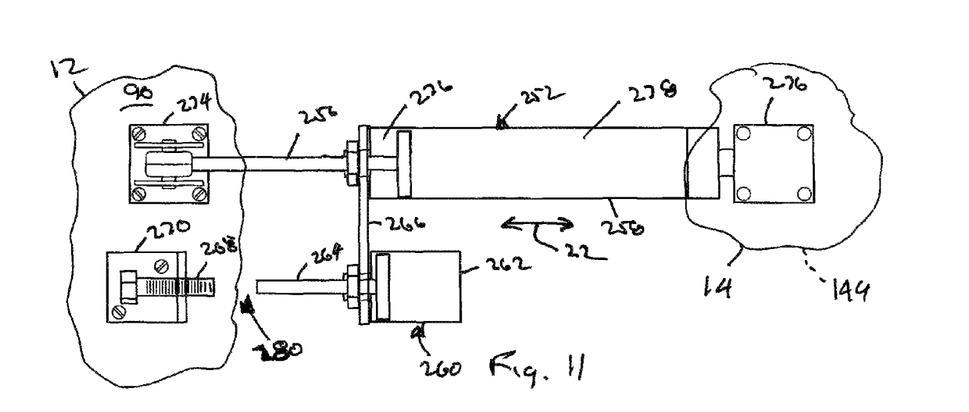
FIG. 11 is a top view of the speed control mechanism of FIG. 9 at the end of the normal phase.

As shown in FIGS. 9-11, the speed control mechanism 250 includes two cylinders. The first is a main cylinder 252 having the piston 256 attached to the top surface 90 of the base 12, as at 274, and the cylinder housing 258 attached the bottom surface 144 of the table 14, as at 300. The main cylinder 252 is shown as simple single piston, but can be any type of cylinder, such as the double piston cylinder shown in FIG. 8. The second cylinder is a slow cylinder 260 parallel to the drive cylinder 252. The slow cylinder housing 262 is yoked to the main cylinder housing 258, as at 266.

While PHM is in the neutral position, shown in FIG. 9, the slow cylinder piston 264 is fully retracted. The piston 264 abuts the end of an adjustment screw 268, as at 272, that turns into a bracket 270 attached to the top surface 90 of the base 12. The main cylinder 252 is also retracted with hydraulic pressure applied to the retraction chamber 302 of the piston 256.

During the slow phase of the drilling cycle, the slow cylinder is pressurized so that the piston 264 extends for a preset distance. The force of extension by the slow cylinder 260 has to be sufficient to overcome the retracted main cylinder 252. This could be accomplished by having higher pressure directed into the slow cylinder 260 or having a larger diameter cylinder. At the end of the first phase, the slow cylinder piston 264 is fully extended, as in FIG. 10.

In the fast phase, the pressure in the main cylinder 252 is reversed to continue with the regular drilling cycle, that is, pressure is released from the retraction chamber 302 and applied to the extension chamber 304. The main cylinder piston 256 extends until it reaches the end of the drilling cycle, as in FIG. 11. During this fast phase, the slow cylinder piston 264 separates from the adjustment screw 268, as at 306.

During the return phase, the slow cylinder 260 is reset for the next drilling cycle. Alternately the pressures in both cylinders 252, 260 could be coordinated via instrumentation. With very hard materials, it may be useful to also employ the slow cylinder 260 with the pre-drilling function.

The anvil 16, shown in FIGS. 12-15, properly orients and holds the workpiece for drilling. The anvil 16 is a trapezoidal solid with a sloped surface 102 that slopes toward the table top surface 220 and away from the drill bit 30 at a predetermined drill angle 104, typically 10 to 15 degrees. The workpiece 2 is placed against the sloped surface 102 so that the drill angle 104 represents the angle that the hole 4 will be drilled into the workpiece 2 from its surface.

Optionally, the drill angle 104 can be changed and the present invention contemplates several ways of doing so. One way is to design the entire anvil 16 as removable and replaceable with an anvil 16 having a different drill angle 104. Another is to design the anvil 16 with a fixed bottom portion 106 and a replaceable top portion 108 with the sloped surface 102. The replaceable portion 108 is removed and replaced with a replaceable portion 108 that has a different drill angle 104. The replaceable portion 108 can be secured to the fixed portion 106 by any method known in the art.

Figure 12:
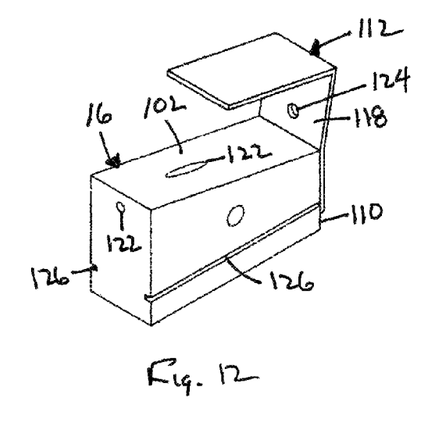
FIGS. 12-15 are detailed views of various configurations of the anvil.
Figure 13:
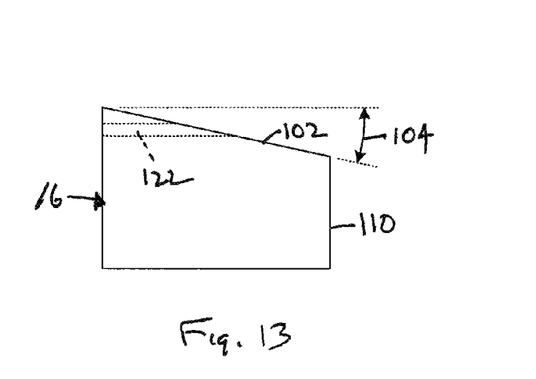
Figure 14:
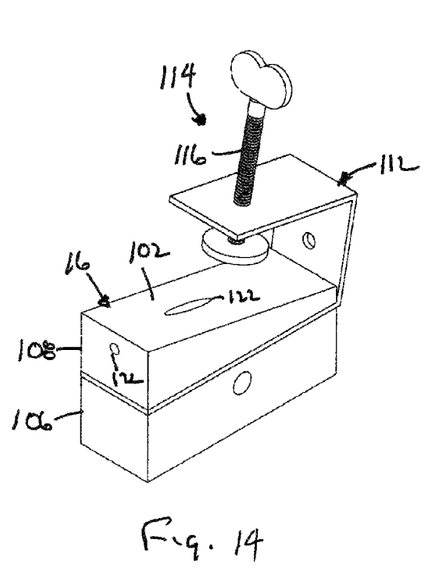
Figure 15:
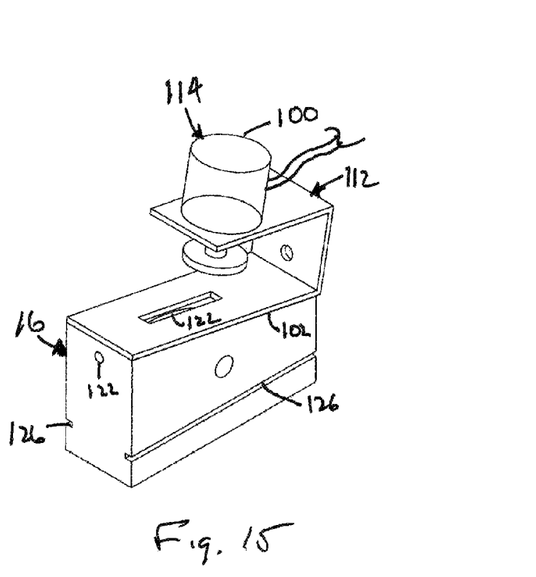

The anvil 16 includes a bracket 112 that secures the workpiece 2 against the sloped surface 102 of the anvil 16 while drilling takes place. Several different configurations of the bracket 112 are shown in FIGS. 12, 14, and 15. In FIG. 12, the bracket 112 is an L bracket mounted to the end surface 110. In FIG. 14, the bracket 112 is a C bracket mounted between the fixed portion 106 and replaceable portion 108 of the anvil 16.

In FIG. 15, the bracket 112 is a C bracket mounted to the sloped surface 102. The bracket 112 can be permanently or removably mounted.

The bracket 112 includes a clamp 114 for securing the workpiece against the sloped surface 102. In one configuration, shown in FIG. 14, the clamp 114 is a manual screw 116. In another configuration, shown in FIG. 15, the clamp 114 is a pneumatic piston 100.

Each bracket 112 has a maximum workpiece thickness that it can accommodate. Optionally, the rear portion 118 is adjustable to allow for different thicknesses of the workpiece. In addition or alternatively, if the bracket 112 is removable, different brackets 112 can be designed to accommodate different workpiece thicknesses.

Figure 16:
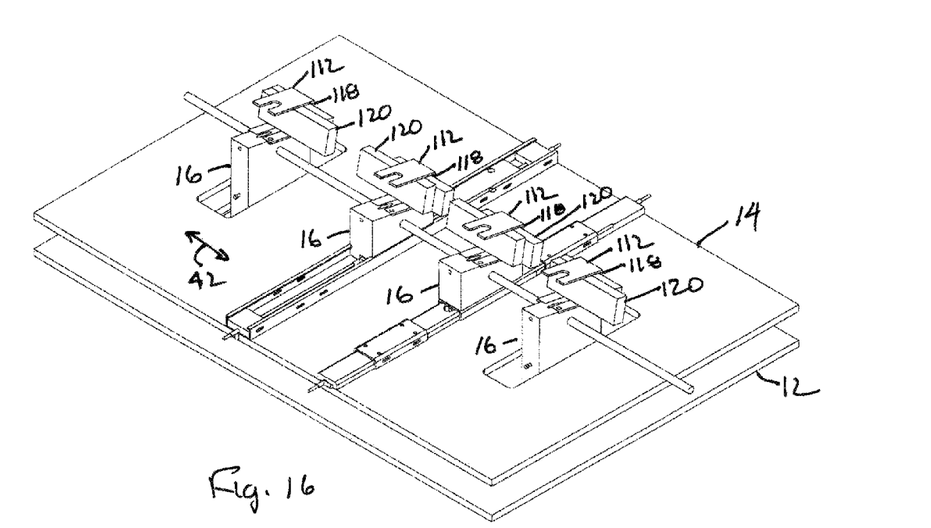
FIG. 16 is a perspective view of individual fences for each anvil.
Figure 17:
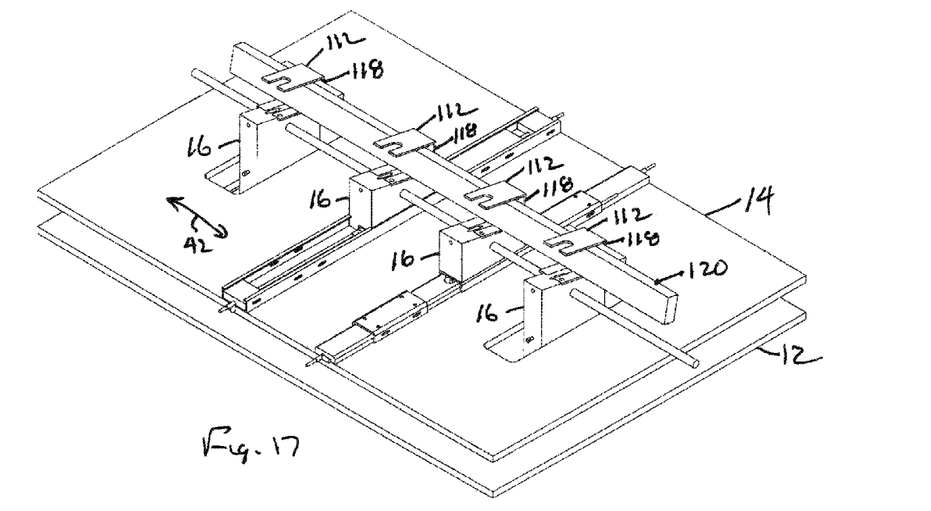
FIG. 17 is a perspective view of a single fence that spans the anvils.

Optionally, a fence 120 is attached to the bracket 112, typically at the rear portion 118, to provide a stop for the workpiece 2. A separate fence 120 can be mounted to each bracket 112, as in FIG. 16, or a single fence 120 can extend across all of the brackets 112, as in FIG. 17.

The anvil 16 includes a through hole 122 aligned with the drill bit 30 that acts as a drill guide during drilling. If the two-spindle embodiment is employed, there is a through hole 124 in the bracket 112 aligned with the pilot hole drill bit 32 that acts as a drill guide for the pilot hole drill bit 32.

As described above, the anvil 16 is fixed relative to the base 12 during drilling. The fixation mechanism must permit the anvil 16 to slide perpendicular to the table motion 22 so that the hole spacing can be adjusted. One mechanism is shown in FIG. 1. Supports 180 attached to the top surface 90 of the base 12 extend to approximately the height of the anvil 16. A horizontal rod 182 fixed to the supports 180 extends through a hole 184 in the anvil 16. Since the rod 182 is fixed relative to the base 12, the anvil 16 does not move with the table 14. The hole 184 is sized to allow the anvil 16 to slide on the rod 182. The rod 182 will typically be round, but any shape can be used.

Figure 18:
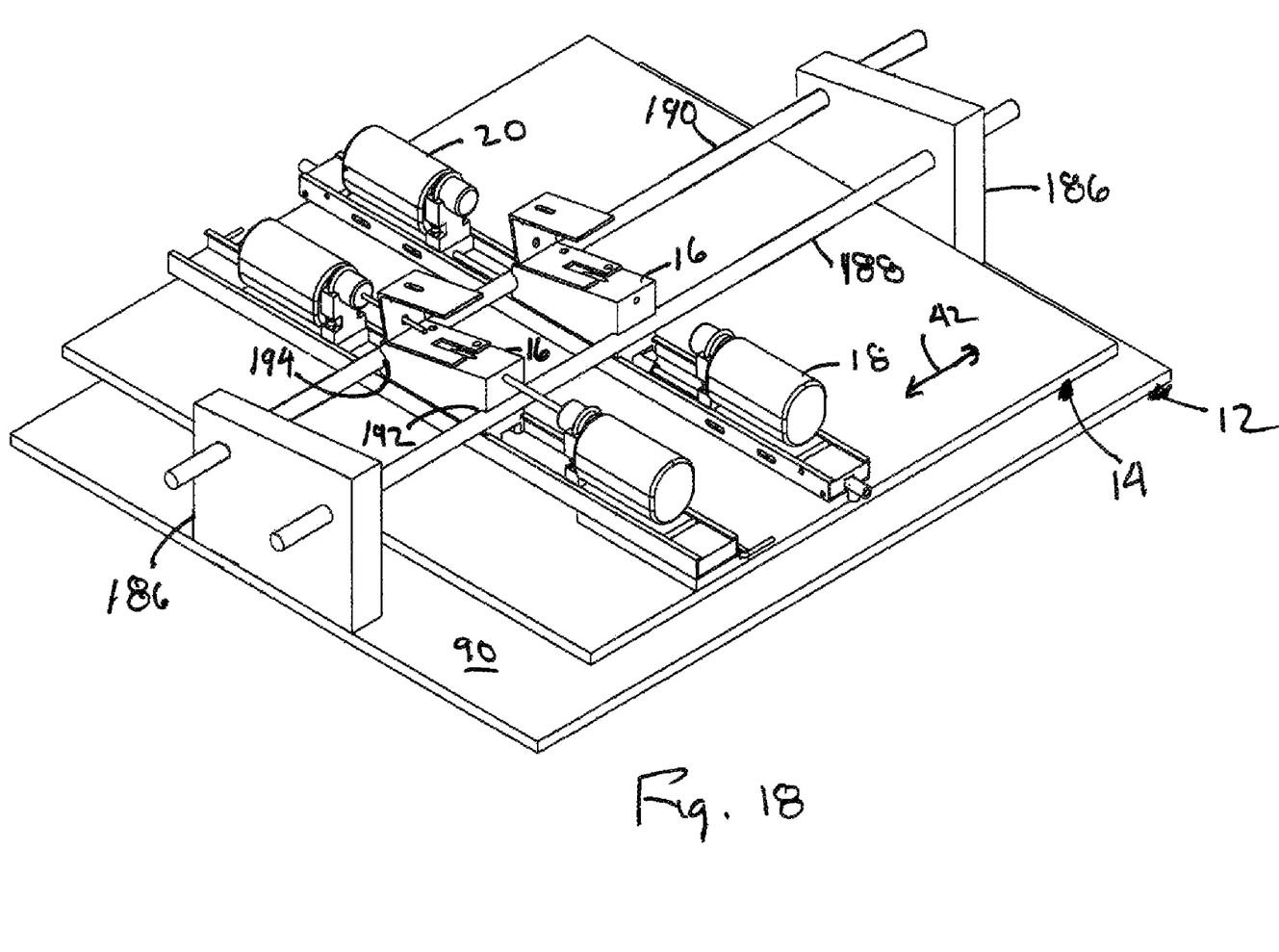
FIG. 18 is a top, perspective view of the double-rod embodiment of the pocket hole machine of the present invention.

Another fixation mechanism is shown in FIG. 18. Two rods 188, 190 are fixed to supports 186 and extend through grooves 192, 194 on the front and back of the anvil 16. This configuration is more complicated but allows for much easier replacement of the anvil 16. One of the rods 188 can be removed and the anvil 16 replaced rather than having to remove one end of the rod 182 and slide the anvil 16 off, as in the single rod embodiment of FIG. 1.

Figure 19:
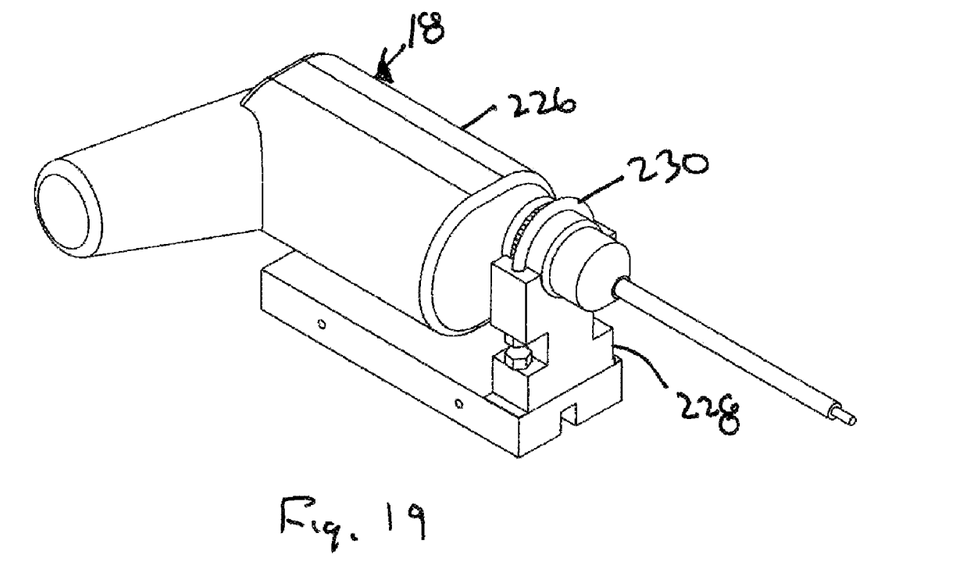
FIG. 19 shows a detail view of a hand power drill mounted as a drill spindle.
Figure 20:
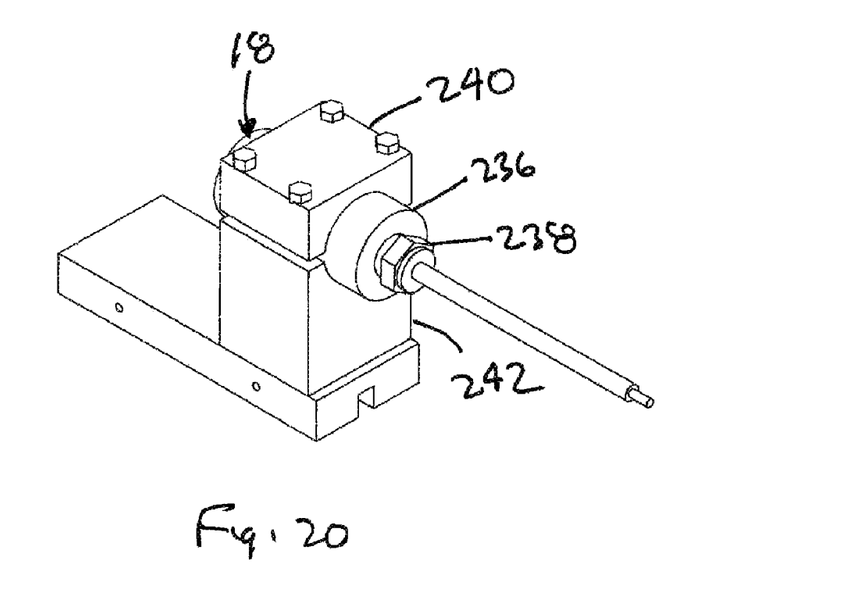
FIG. 20 shows a detail view of a motor with drill bit chuck mounted as a drill spindle.

The drill spindle 18 spins the drill bit 30 for drilling into the workpiece. The present invention contemplates several different configurations for the drill spindle 18. In one configuration, the drill spindle 18 is a power hand drill 226 that is yoked to a cradle 228 on the rail 40 by a mounting collar 230, as in FIG. 19. The mounting collar 230 is shown as a U-bolt, but can be any similar mechanism, including a strap or block. In another configuration, the drill spindle 18 is simply a motor 236, electric or pneumatic, with the drill chuck 238, as in FIG. 20. The motor may be fixed or removable attached, as with collar 240, to a cradle 242. The mounting collar 240 is shown as a block, but can be any similar mechanism, including a strap or U-bolt.

If the drill spindle 18 is removable, when it is mounted, it may need to be both aligned with the drill guide 122 and set to a rest position on the rail 40 when the table 14 is in the neutral position 24. Optionally, the cradle 228 includes the means for making the appropriate adjustments. One such adjustment mechanism can be a set screw through the rail 40 or through the cradle.

If the optional second spindle 20 is employed, it can have all of the same configurations as the first spindle 18.

As described above, in order to allow for infinite spacing adjustment, the first spindle 18 and optional second spindle 20 are mounted to the rail 40. The rail 40 is slidably mounted to the table 14 so that the rail 40 can slide perpendicular to the table motion direction 22. The rail 40, anvil 16, first spindle 18, and optional second spindle 20 together form a carriage 38.

The rail 40 can have several different configurations, shown in FIG. 1. In one configuration 200, the rail 40 is hollow with an open top, for example, an inverted T-shaped cross section, in which is mounted the spindle 18. In another configuration 202, the rail 40 is solid and the spindle 18 is mounted to the outside. In another configuration, the rail 40 is a single or double rod on which is mounted the spindle 18.

Since the anvil 16 is fixed relative to the base 12 and the rail 40 moves with the table 14, the anvil 16 slides relative to the rail 40 when the table 14 moves. With the open top rail 40, the anvil 16 may include grooves 126, as seen in FIGS. 8 and 12, to slide in the rail 40. With the solid rail 40, the anvil 16 includes downward extensions 128, as seen in FIG. 1, that straddle the rail 40 so that the anvil 16 can slide on the rail 40. The anvil 16 and rail 40 are designed so that that anvil 16 slides easily on the rail 40.

As described above, the carriage 38 can be either enabled or disabled by the latch 44. The present invention contemplates several different configurations for the latch 44. At its simplest, the latch 44 is a manual clamp that secures the rail 40 to the table 14 to enable the carriage 38. When a carriage 38 is to be disabled, removing the clamp and inserting a pin through aligned holes in the rail 40 and anvil 16 locks the rail 40 to the anvil 16.

Figure 21:
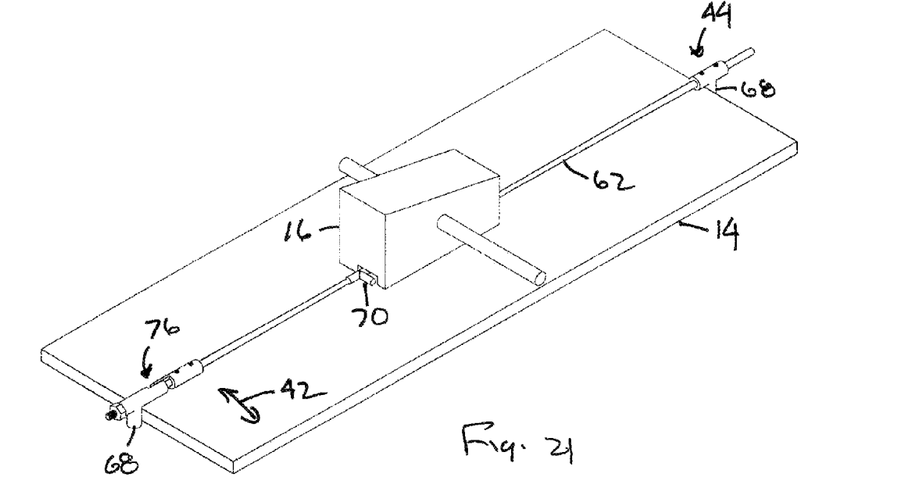
FIG. 21 shows a simple carriage latch.

A latch 44 with fewer manual steps is shown in several configurations in FIGS. 1 and 21. The length of the rail 40 is the same as the width 60 of the table 14 in the drilling direction 22. A dowel 62 extends the width 60 of the table 14 either within the rail 40, as at 64, or alongside the rail 40, as at 66. Table fingers 68 extend in the same direction from both ends of the dowel 62 where the distance between the table fingers 68 is the width of the table 14. A pair of anvil fingers 70 extend from the dowel 62 in the same direction and are oriented on the dowel between 90° and 180° from the table fingers 68. In the figures, the anvil fingers 70 are shown oriented 90° from the table fingers 68. The distance between the anvil fingers 70 is the length of the anvil 16 and they are positioned with the anvil 16 between them when the table 14 is in the neutral position 24. Optionally, a mechanism 76 may be used to precisely adjust the length of the dowel 62.

When the dowel 62 is rotated such that the table fingers 68 attach to the table 14 by straddling the table 14 and the anvil fingers 70 detach from the anvil 15 by not straddling the anvil 16, as at 72, the rail 40 is latched to the table 14 and moves with it. When the dowel 62 is rotated such that the table fingers 68 detach from the table 14 by not straddling the table 14 and the anvil fingers 70 attach to the anvil by straddling the anvil 16, as at 74, the rail 40 is latched to the anvil 16 and does not move with the table 14. In either position, the rail 40 moves with the latch 44.

Alternatively, rather than fingers straddling the table 14 and anvil 16, a table finger attaches to the table 14 by extending into an aperture in the table 14 and an anvil finger attached to the anvil 16 by extending into an aperture in the anvil 16.

Figure 22:
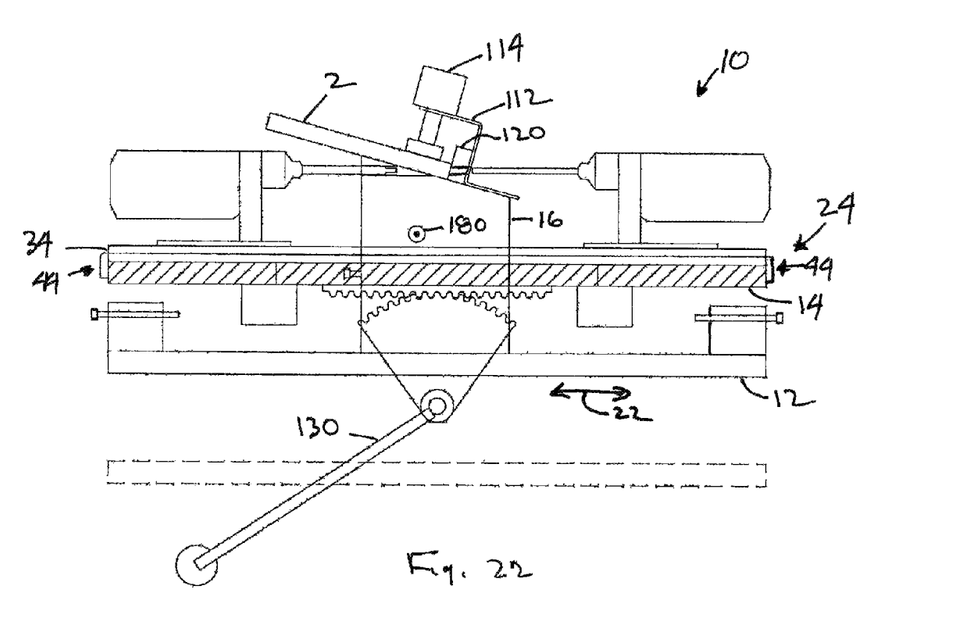
FIG. 22 is a side view of the pocket hole machine of the present invention in the neutral position.
Figure 23:
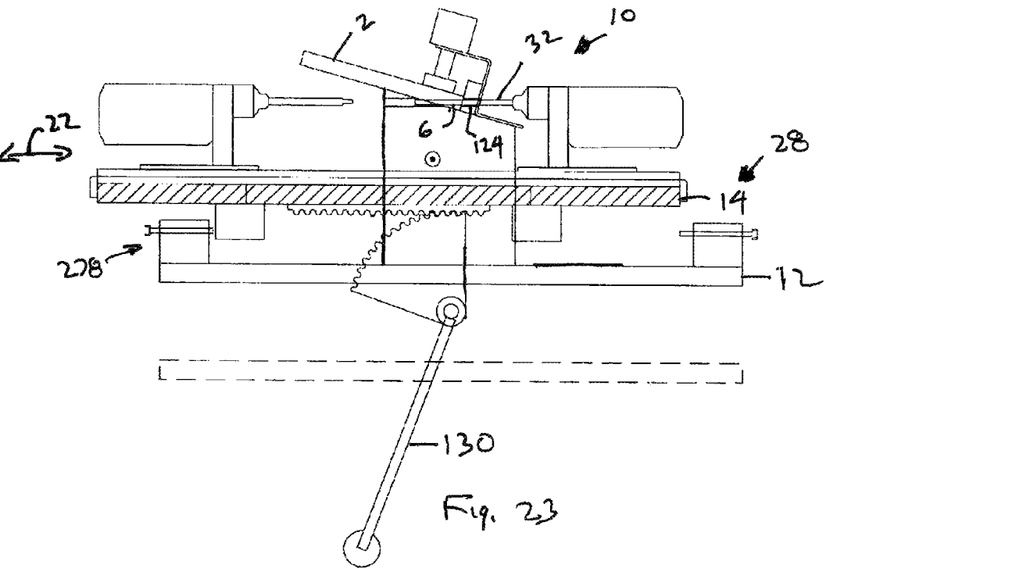
FIG. 23 is a side view of the pocket hole machine of the present invention in the back (pre-drill) position.
Figure 24:
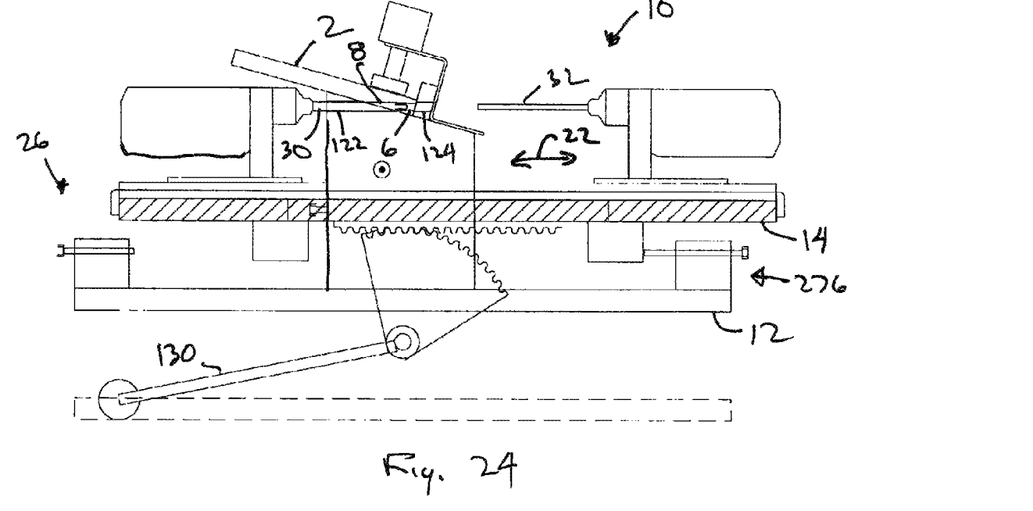
FIG. 24 is a side view of the pocket hole machine of the present invention in the forward (drill) position.

FIGS. 22-24 show the three working positions of the PHM of the present invention. FIG. 22 shows the neutral position 24. In this position, the PHM 10 can be set up. First, the desired locations of the pocket holes 4 are set by moving the carriages 34 along the rod 180. Then the carriages 34 are enabled or disabled by the latches 44.

The workpiece 2 is placed on the anvils 16 against the brackets 112 or fence(s) 120 and the clamps 114 are tightened onto the workpiece 2. If the two-spindle option is available and desired, the handle 130 is pushed forward in order to move the table to the predrill position 28, as in FIG. 23. As the table 14 moves backwardly, the pilot hole bit 32 moves through the hole 124 in the bracket 112 and fence 120 and into the workpiece 2, drilling the pilot hole 6 in the workpiece 2. Rearward motion is limited by the predrill stop 278.

The handle 130 is pulled back in order to move the table to through the neutral position 24 to the drill position 26, as in FIG. 24. As the table 14 moves to the neutral position 24, the pilot hole bit 32 pulls out of the pilot hole 6 and bracket 112. As the table 14 continues to move forwardly, the forward bit 30 enters the guide hole 122 in the anvil 16 and then into the workpiece 2, drilling the countersink hole 8 in the workpiece 2. Forward motion is limited by the drill stop 276.

After the countersink hole 8 is drilled, the handle 130 is pushed back until the table 14 is in the neutral position, pulling the forward bit 30 from the workpiece 2. Then the clamps 114 are loosened and the workpiece 2 is removed.

Thus it has been shown and described a pocket hole apparatus which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. An apparatus for producing a plurality of pocket holes at an angle in a workpiece, said apparatus comprising:
    (a) a base;
    (b) a table parallel to said base and having a top surface opposite said base;
    (c) a reciprocating mechanism for reciprocating said table relative to said base in a drilling direction between at least a neutral position and a drilling position;
    (d) a plurality of carriages, each of said carriages comprising (1) a first spindle having a first drill bit that extends parallel to said drilling direction; (2) an anvil extending from said table top surface, said anvil being fixed relative to said base in said drilling direction and having a sloped top surface adapted to receive and affix said workpiece, said sloped top surface being sloped away from said first drill bit and toward said table top surface at said angle; and (3) a latching mechanism for latching said spindle in a disabled position wherein said first spindle is fixed relative to said base in said drilling direction, and in an enabled position wherein said spindle is fixed relative to said table in said drilling direction;
    (e) whereby said workpiece is affixed to said anvil when said table is in said neutral position, said table is reciprocated to said drilling position to drill said pocket hole, and said table is reciprocated to said neutral position for removal of said workpiece.

2. The apparatus of claim 1 wherein said plurality of carriages have spacing in a spacing direction perpendicular to said drilling direction, and said carriage further comprises a rail that extends in said drilling direction, said first spindle being attached to said rail, said rail being movable in said spacing direction, and said rail controlling motion of said anvil in said spacing direction, whereby said spacing is set by moving at least one of said plurality of carriages in said spacing direction.

3. The apparatus of claim 2 wherein one of said plurality of carriages is fixed in said spacing direction.

4. The apparatus of claim 2 further comprising at least one rod extending through said anvils for fixing said anvils relative to said base in said drilling direction, said at least one rod being attached to supports attached to said base.

5. The apparatus of claim 2 further comprising a second spindle attached to said rail and having a second drill bit axially aligned with said first drill bit, said second spindle being fixed relative to said base in said drilling direction when said latching mechanism is in said disabled position and fixed relative to said table in said drilling direction when said latching mechanism is in said enabled position, said reciprocating mechanism further reciprocating said table relative to said base between said neutral position and a predrilling position, whereby, prior to reciprocating said table to said drilling position, said table is reciprocated to said predrilling position and then to said neutral position to predrill said pocket hole.

6. The apparatus of claim 1 wherein said table has a width in said drilling direction and said latching mechanism includes a dowel that extends at least said table width and that has at least one table finger and at least one anvil finger extending therefrom, wherein said at least one table finger attaches to said table when in said enabled position and said at least one anvil finger attaches to said anvil when in said disabled position.

7. The apparatus of claim 6 wherein said at least one table finger is two table fingers that straddle said table in said enabled position and said at least one anvil finger is two anvil fingers that straddle said anvil when in said disabled position.

8. The apparatus of claim 1 further comprising a second spindle having a second drill bit axially aligned with said first drill bit, said second spindle being fixed relative to said base in said drilling direction when said latching mechanism is in said disabled position and fixed relative to said table in said drilling direction when said latching mechanism is in said enabled position, said reciprocating mechanism further reciprocating said table relative to said base between said neutral position and a predrilling position, whereby, prior to reciprocating said table to said drilling position, said table is reciprocated to said predrilling position and then to said neutral position to predrill said pocket hole.

9. The apparatus of claim 1 wherein said angle of said sloped top surface is adjustable.

10. The apparatus of claim 1 wherein said anvil includes a guide hole through which said first drill bit extends when said table is reciprocated to said drilling position.

11. The apparatus of claim 1 wherein said reciprocating mechanism is manually operated.

12. The apparatus of claim 1 wherein said reciprocating mechanism includes at least one pneumatic cylinder.

13. An apparatus for producing a plurality of pocket holes at an angle in a workpiece, said apparatus comprising:
  (a) a base;
  (b) a table parallel to said base and having a top surface opposite said base;
  (c) a reciprocating mechanism for reciprocating said table relative to said base in a drilling direction between at least a neutral position and a drilling position;
  (d) a plurality of carriages having spacing in a spacing direction perpendicular to said drilling direction, each of said carriages comprising (1) a rail that extends in said drilling direction and being movable in said spacing direction; (2) a first spindle attached to said rail and having a first drill bit that extends parallel to said drilling direction; (3) an anvil extending from said table top surface, said anvil being fixed relative to said base in said drilling direction and having a sloped top surface adapted to receive and affix said workpiece, said sloped top surface being sloped away from said first drill bit and toward said table top surface at said angle, said rail controlling motion of said anvil in said spacing direction; and (4) a latching mechanism for latching said rail in a disabled position wherein said rail is fixed relative to said base in said drilling direction, and in an enabled position wherein said rail is fixed relative to said table in said drilling direction;
  (e) whereby said spacing is set by moving at least one of said plurality of carriages in said spacing direction, each of said carriages is enable or disabled by the latching mechanism, said workpiece is affixed to said anvil when said table is in said neutral position, said table is reciprocated to said drilling position to drill said pocket hole, and said table is reciprocated to said neutral position for removal of said workpiece.

14. The apparatus of claim 13 wherein one of said plurality of carriages is fixed in said spacing direction.

15. The apparatus of claim 13 further comprising at least one rod extending through said anvils for fixing said anvils relative to said base in said drilling direction, said at least one rod being attached to supports attached to said base.

16. The apparatus of claim 13 further comprising a second spindle attached to said rail and having a second drill bit axially aligned with said first drill bit, said second spindle being fixed relative to said base in said drilling direction when said latching mechanism is in said disabled position and fixed relative to said table in said drilling direction when said latching mechanism is in said enabled position, said reciprocating mechanism further reciprocating said table relative to said base between said neutral position and a predrilling position, whereby, prior to reciprocating said table to said drilling position, said table is reciprocated to said predrilling position and then to said neutral position to predrill said pocket hole.

17. The apparatus of claim 13 wherein said table has a width in said drilling direction and said latching mechanism includes a dowel that extends at least said table width and that has at least one table finger and at least one anvil finger extending therefrom, wherein said at least one table finger attaches to said table when in said enabled position and said at least one anvil finger attaches to said anvil when in said disabled position.

18. The apparatus of claim 13 wherein said angle of said sloped top surface is adjustable.

19. The apparatus of claim 13 wherein said reciprocating mechanism is manually operated.

20. The apparatus of claim 13 wherein said reciprocating mechanism includes at least one pneumatic cylinder.

* * * * *